United States Patent [19]

To et al.

[11] Patent Number: 5,301,113
[45] Date of Patent: Apr. 5, 1994

[54] ELECTRONIC SYSTEM AND METHOD FOR CALCULATING DISTANCE TO EMPTY FOR MOTORIZED VEHICLES

[75] Inventors: Viet Q. To, Sterling Heights; Michael J. Burke, Milford; Nick Sarafopoulos, Taylor, all of Mich.

[73] Assignee: Ford Motor Company, Dearborn, Mich.

[21] Appl. No.: 1,597

[22] Filed: Jan. 7, 1993

[51] Int. Cl.⁵ .................................................. G01F 9/00
[52] U.S. Cl. .................................... 364/442; 73/114; 73/113
[58] Field of Search ............... 364/442, 561, 560, 444; 73/114, 113

[56] References Cited

U.S. PATENT DOCUMENTS

| | | | |
|---|---|---|---|
| 3,589,176 | 6/1971 | Wellons | 73/113 |
| 4,046,998 | 9/1977 | Kuno et al. | 235/150.21 |
| 4,157,030 | 6/1979 | Keely | 73/113 |
| 4,217,644 | 8/1980 | Kato et al. | 364/442 |
| 4,400,779 | 8/1983 | Kosuge et al. | 364/442 |
| 4,564,905 | 1/1986 | Masuda et al. | 364/424 |
| 4,663,718 | 5/1987 | Augello et al. | 364/444 |
| 4,845,630 | 7/1989 | Stephens | 364/442 |

*Primary Examiner*—Thomas G. Black
*Assistant Examiner*—Julie D. Day
*Attorney, Agent, or Firm*—Richard D. Dixon; Roger L. May

[57] ABSTRACT

A system for calculating the distance to empty available from the remaining fuel in a motor vehicle, wherein an average value of the distance traveled per unit of fuel consumed is multiplied by the quantity of fuel remaining, thereby producing an intermediate distance-to-empty value. Responsive to a first type signal being in a first state, a displayed value of DTE is allowed only to decrement. When the first type signal is in a second state, the displayed value of DTE is allowed to both increment and decrement. When the first type signal is in the first state, the updating of the calculation of the DTE value is recalculated as a function of the distance traveled by the vehicle and as a function of the fuel consumed by the vehicle. If the first type signal is in a second state, then the recalculation is controlled as a function of time.

18 Claims, 4 Drawing Sheets

DTE FILTER USING LOW-PASS FILTER

ELECTRONIC SYSTEM AND METHOD FOR CALCULATING DISTANCE TO EMPTY FOR MOTORIZED VEHICLES

BACKGROUND OF THE INVENTION

1. Field of the Invention

The present invention relates to a system and method for indicating the distance to empty corresponding to the fuel remaining in a motorized vehicle.

2. Description of the Prior Art

Systems for calculating and displaying the Distance To Empty (DTE) for the remaining fuel in a motorized vehicle have become more popular as the cost of these systems decreases through the use of highly integrated and accurate electronic systems. Further economies of scale can be achieved if a single distance to empty system can be designed and manufactured so that the system can be operated in several modes, each mode being specifically suited for operation in a different geographical area. For example, in the North American market consumers may prefer that the DTE display should not increment to a higher value at a time when the average fuel economy increases over the value for fuel economy used in previous calculations. On the other hand, European customers may prefer that the displayed DTE be capable of incrementing to a higher value if the average fuel economy increases over the value previously used.

It is also desirable that the displayed value of DTE be updated as a function of different independent variables as preferred by customers in different geographical regions. For example, in North American systems the drivers may prefer that the DTE display value be updated as a function of distance traveled and fuel consumed. On the other hand, European drivers may prefer that the DTE display values be updated periodically even if fuel consumed or distance traveled do not change during the interval.

SUMMARY OF THE INVENTION

It is therefore a primary object of the present invention to provide a system and method for displaying the results of a distance-to-empty calculations that can be customized according to the driver's preference. In the first mode of operation, the displayed DTE value can only be decremented, while in a second mode of operation the DTE value can be both incremented and decremented during operation.

In accordance with the present invention a system is defined for calculating the distance to empty available from the remaining fuel in a motor vehicle. An average value of the distance traveled per unit of fuel consumed is multiplied by the quantity of fuel remaining, thereby producing an intermediate distance-to-empty value. Responsive to a first type signal being in a first state, a displayed value of DTE is allowed only to decrement. When the first type signal is in a second state the displayed value of DTE is allowed to both increment and decrement.

When the first type signal is in the first state, the updating of the calculation of the DTE value is recalculated as a function of the distance traveled by the vehicle and as a function of the fuel consumed by the vehicle. If the first type signal is in a second state, then the recalculation is controlled as a function of time.

DESCRIPTION OF THE DRAWINGS

The present invention will be apparent from the detailed description taken in conjunction with the accompanying drawings in which.

DETAILED DESCRIPTION OF THE PREFERRED EMBODIMENT

Figure 1:
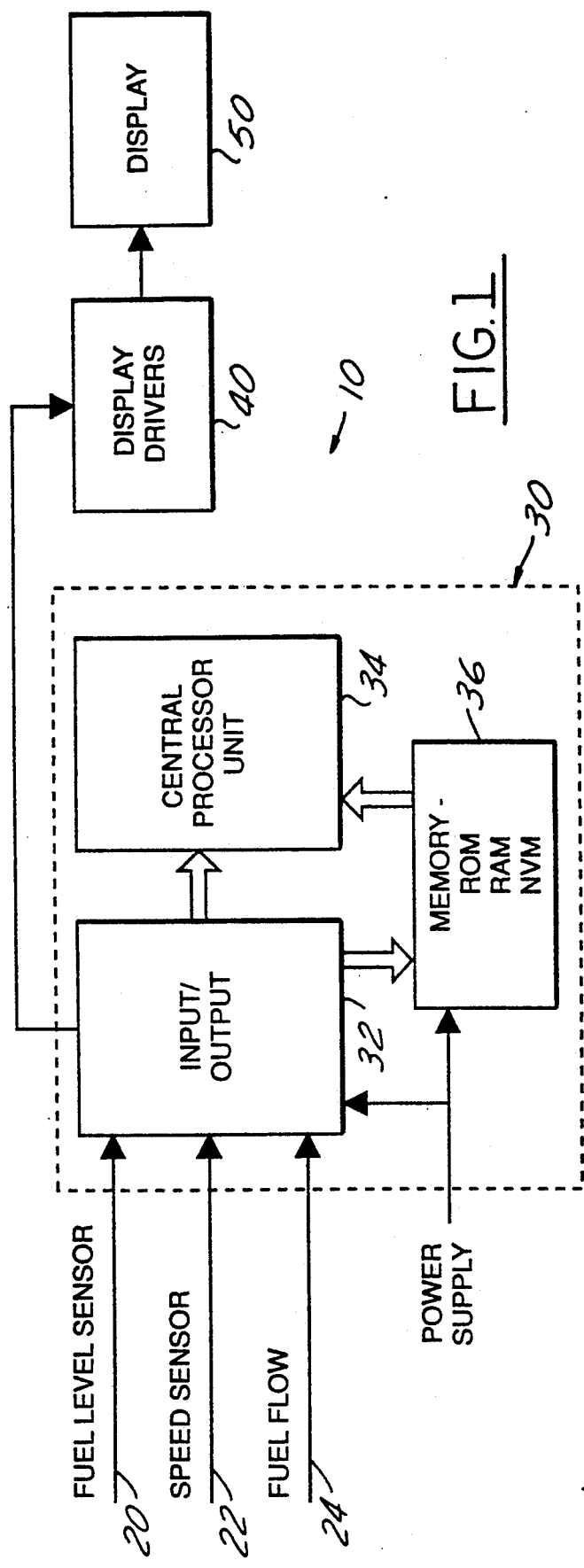
FIG. 1 illustrates a first preferred embodiment of a schematic block diagram of a system for calculating and displaying distance to empty values.

A system for indicating the remaining distance available from the fuel remaining in the tank of a motor vehicle is illustrated generally as reference numeral 10 in FIG. 1. The system uses a fuel level sensor signal 20 generally comprising an analog signal generated by a level sensing subsystem located in the fuel storage tank of the vehicle. This fuel level sensor signal 20 is coupled to the Input/Output drivers 32 included in a microcontroller assembly, shown generally as 30. The microcontroller 30 includes a central processing unit 34 and various memories 36, including pre-programmed ROM memory, battery-backed RAM memory and programmable Non-Volatile Memory (NVM), shown collectively as 36. The fuel level signal 20 is converted to a digital signal in the Input/Output section 32 of the microcontroller 30.

A signal representative of the vehicle speed 22 is generated by a vehicle speed sensor which may be either coupled to the transmission of the vehicle drivetrain or to one of the wheels of the vehicle in order to develop a digital signal representative of the distance traveled and the speed of the vehicle. The vehicle speed signal 22 is coupled to the Input/Output section 32 of the microcontroller 30 as shown.

A fuel flow signal 24 is coupled into the Input/Output section 32 of the microcontroller 30. The fuel flow signal is representative of the fuel flowing from the fuel tank and into the engine of the vehicle. The fuel flow signal 24 can be generated in a number of ways, including either sensing the fuel flow through a fuel line connecting the storage tank to the engine or, as used in the preferred embodiment, by generating a signal representative of the fuel actually injected into the combustion chambers of the engine. Such a signal typically is generated by the electronic engine control system in the form of digital pulses representative of the duration of the opening of the fuel injector valves. This method of generating the fuel flow signal 24 is very accurate and is normally available from existing vehicle electronic systems such as the electronic engine control system.

The microcontroller 30 utilized in the preferred embodiment is a Motorola 68HC11 that includes 8–12 K of ROM, 256–512 bytes of RAM and 512 bytes of Non-Volatile Memory. The display drivers 40 are coupled to the I/O section of the microcontroller and control a visual display, shown generally as 50. This visual display may take the form of a vacuum fluorescent display, an LCD display, a dot matrix display, or some other digital representation of the output of the microcontroller 30. While the preferred embodiment envisions the use of a digital display 50, it would also be possible to include or substitute an analog display. A digital display has been chosen because the display is typically used as part of an integrated digital instrument cluster in an automotive vehicle that displays other computations performed by the microcontroller 30, including such functions as instantaneous fuel economy, average fuel economy, etc.

The DTE output signal representative of the distance-to-empty calculation can be calculated through the use of the following formula:

$$DTE = \text{Fuel Economy} \times \text{Fuel Level (Remaining)}$$

Distance-to-empty is derived from the calculation of fuel economy multiplied by the remaining fuel level. The fuel level signal 20 is provided from the fuel level sensor as previously explained. Fuel economy can be derived by calculating the distance traveled divided by the fuel consumed over a given unit of time. The distance traveled portion of the calculation is developed in the microcontroller 30 from the speed sensor signal 22, while the fuel consumed portion of the algorithm is developed in the microcontroller 30 from the fuel flow signal 24.

Figure 2A:
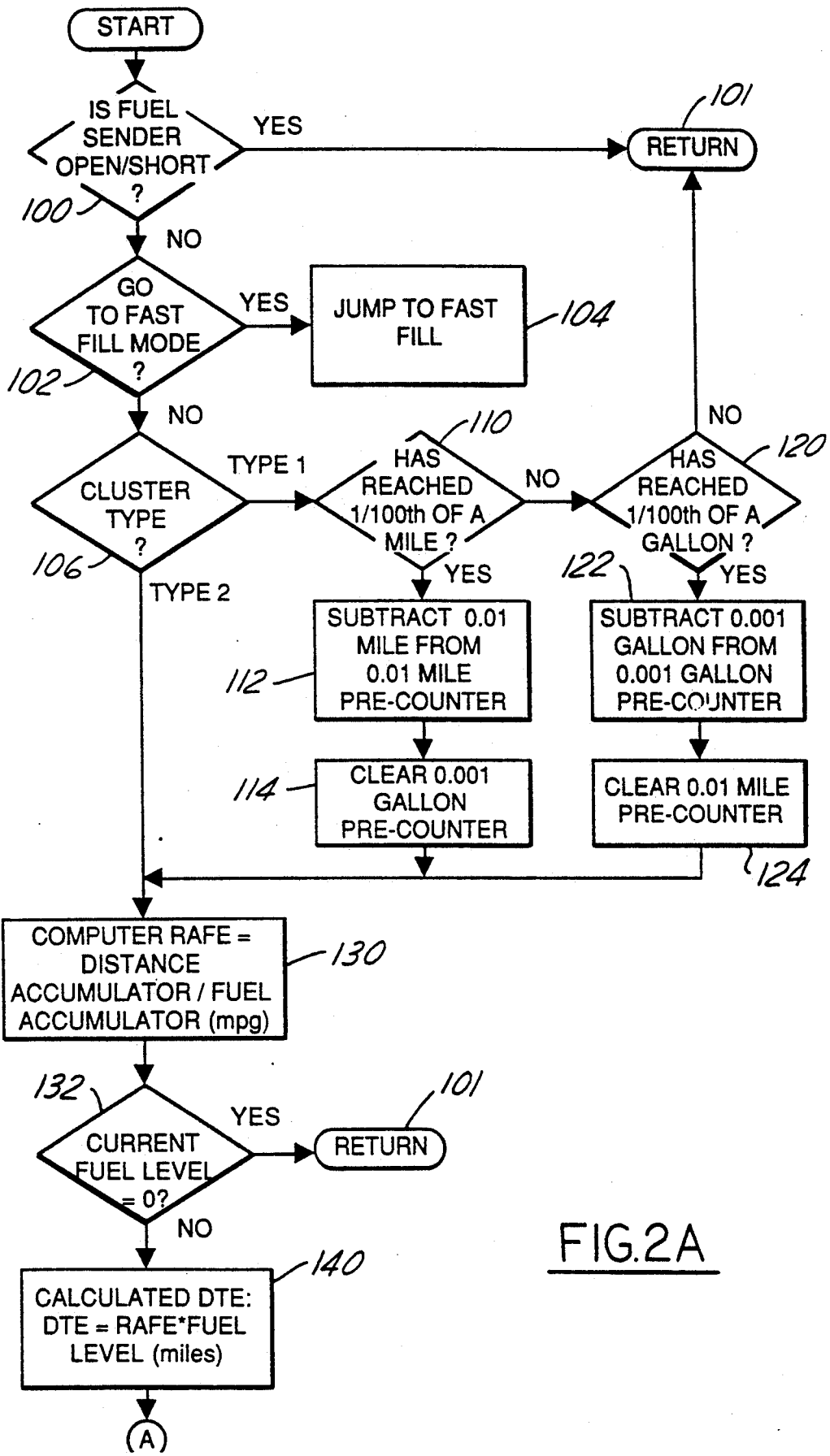
FIGS. 2A, 2B and 2C illustrate a functional block diagram for the method in accordance with the Present invention.
Figure 2B:
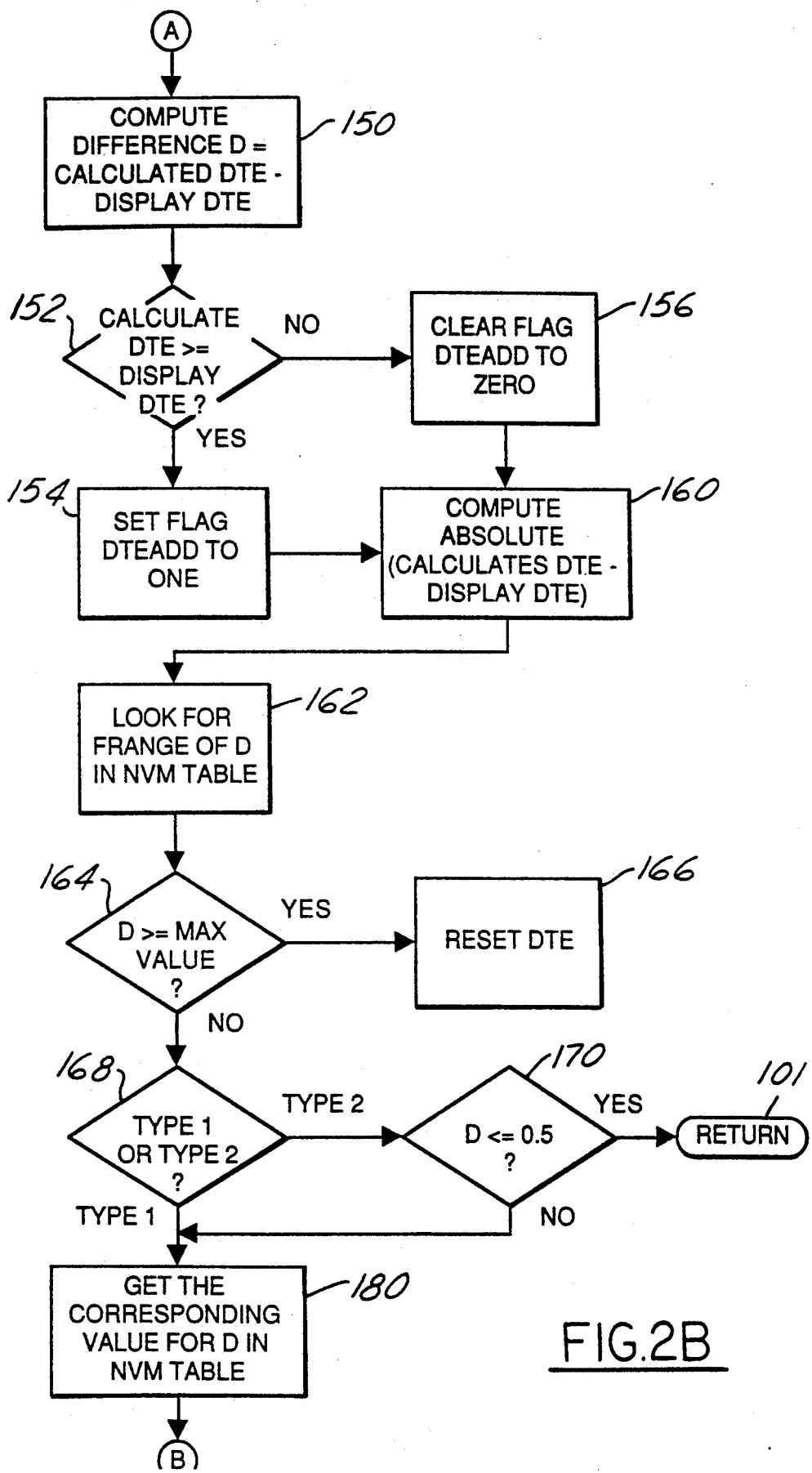
Figure 2C:
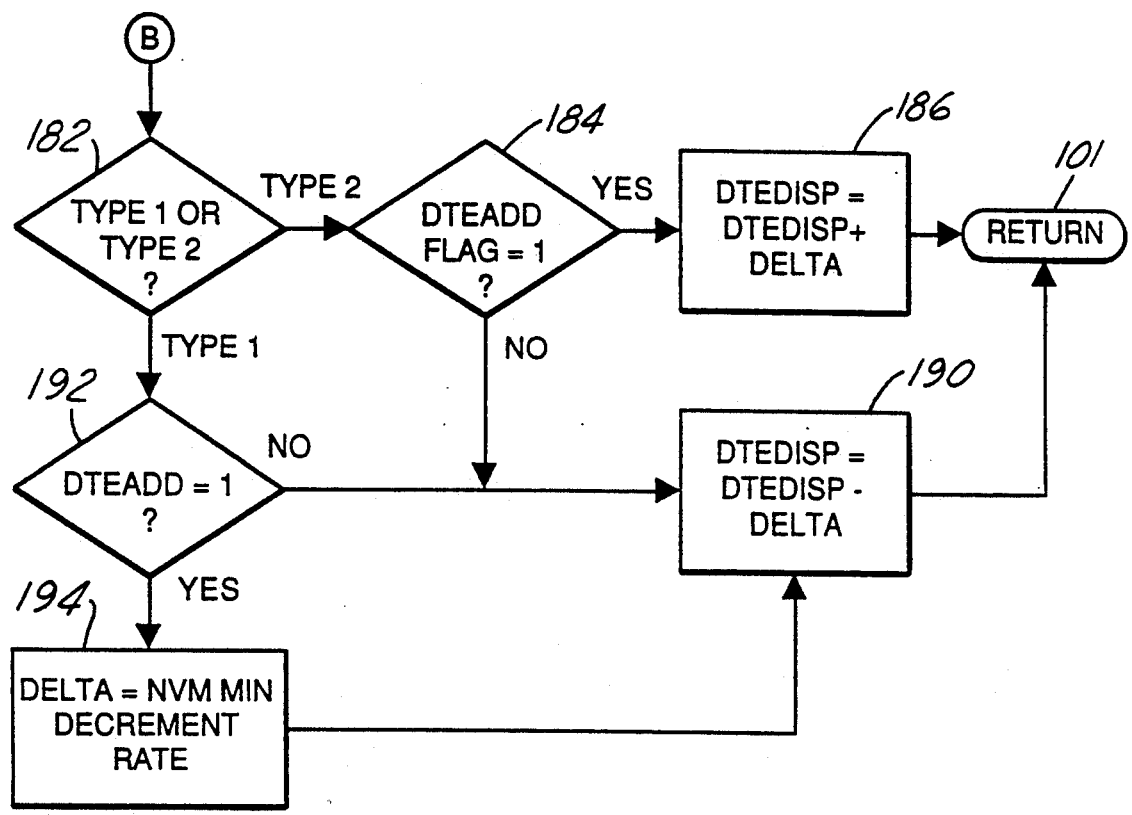

The functioning of the microcontroller 30 is controlled by software, the simplified flow diagram for which is shown in FIGS. 2A and 2B. With reference to FIG. 2A, the software is initialized when power is applied to the microcontroller. The first step 100 includes a test of the fuel sender which develops the fuel level sensor signal 20 in order to determine if it is open or shorted. If the fuel sender is shorted or open then the program proceeds to step 101 which displays a failure mode signal to the driver. The program checks a programmed bit in the NVM memory 36 in order to determine if the distance-to-empty system has been programmed as a type 1 or type 2 system. In a type 1 system, the distance-to-empty signal from the microcontroller is not permitted to increase in value at any time during the operation of the system except when fuel is added to the tank in the fast fill mode. In a type 2 system, any change in the operating characteristics of the vehicle that tends to cause an increase in fuel economy will, after a predetermined period of time, be reflected in an increase in the distance-to-empty signal displayed on the visual display 50. Therefore, the type 2 system is capable of both incrementing and decrementing the DTE displayed, as compared to the type 1 system that can only decrement the DTE displayed.

While this single bit is programmed in the NVM memory 36 at the time the system or module is programmed and installed in the vehicle, in an alternate embodiment this single bit could be represented by the position of a switch that changes from 1 to 0.

Assuming that a type 1 system is being utilized, the program at step 110 checks a storage register in the RAM memory 36 of the microcontroller that stores a value representative of the distance traveled. This register typically accumulates the digital pulses from the speed sensor signal 22 and indicates that the vehicle has traveled a predetermined distance, such as 0.01 miles. The samples representative of steps 110 and 120 are sampled approximately every 131 milliseconds. In the case of step 110, if the distance pulses have accumulated and exceeded 0.01 mile, then the program proceeds to step 112 which decrements the distance memory by 0.01 miles and then in step 114 resets the fuel flow counter used in step 120 to zero. After step 114 the program proceeds to the next step which computes the RAFE (Running Average Fuel Economy) in step 130 as will be discussed subsequently.

Going back to step 110, if the distance pulses have not yet accumulated to 0.01 miles, then the program proceeds to step 120 in order to determine if the fuel flow pulses being accumulated in a section of RAM memory have reached 0.001 gallons (or some other appropriate unit of measurement). At step 120, the accumulator counts the digital pulses generated by the fuel flow sensor signal 24 which can be calibrated to a given number of pulses per volume of fuel consumed by the engine. If the number of pulses in the accumulator has not exceeded 0.001 gallons, then the program proceeds to step 101 which returns control to the main program which will return to step 100 131 ms later. If on the other hand the fuel flow pulses have accumulated and now exceed 0.001 gallons, then the program proceeds to step 122 whereby 0.001 gallons are subtracted from the fuel flow accumulator. Then, in step 124, the distance accumulator is reset to zero and the program Proceeds to step 130 to calcuate the RAFE.

In view of the foregoing explanations for program steps 106, 110 and 120 for a type 1 system, it will be apparent that the recalculation of RAFE in step 130 in a type 1 system can be initiated either by the vehicle traveling 0.01 miles or by the vehicle using 0.001 gallons of fuel. Therefore, the recalculation at step 130 of RAFE is initiated either by a known distance traveled or by a known volume of fuel consumed. The distance traveled mode is the normal mode that causes the recomputation of RAFE at step 130. However, if the vehicle is parked and fuel is consumed without moving, the step 120 recalculation will be responsive to fuel flow and not distance traveled At step 130, the RAFE value is calculated by dividing the distance accumulator value stored in RAM by the fuel accumulator value stored in RAM. This calculation provides the running average fuel economy (RAFE) based upon the latest time interval values for these variables.

At step 132 the fuel level value 20 is examined. If the level is 0, then a 0 distance to empty (DTE) value is displayed and the program returns control to the main program at step 101. If the fuel level sensor signal 20 is greater than 0, then the current DTE is calculated at step 140 by multiplying the RAFE value calculated in step 130 by the value of the fuel level sensor signal 20. This calculation will provide a distance-to-empty value that is current and correct.

It should be obvious that if this value of DTE were to be displayed immediately, there could be a rapid fluctuation in the DTE value based upon rather short fluctuations in distance traveled and fuel consumed. An algorithm will now be explained to alleviate the short term fluctuations.

With reference to FIGS. 2A and 2B, at step 150, the newly calculated DTE from step 140 has subtracted from it the value of DTE previously calculated by the microcontroller 30 and presently being displayed on display 50. At step 152, the calculated DTE value from step 140 is compared to the display DTE value used in step 150. If the calculated value is greater than or equal to the display value, then in step 154 an enable flag, also known as DTEADD, is set to 1. In step 156 if the display value is greater than the calculated value, then the DTEADD flag is set to $\phi$, and the display cannot be incremented to the new value of DTE. The display system 10 is constructed such that if the DTEADD flag (which actually is a single bit of RAM memory) is 0, then for a type 2 system the microcontroller 30 is enabled to change the display 50 to the newly calculated DTE value. If the DTEADD flag is 1, and if the system is set for a type 1 system, then in either case the DTE display 50 will not be changed by the microcontroller 30 to display the newly calculated value of DTE from step 140.

In step 160, the absolute value of the difference between the calculated DTE value and the displayed DTE value is then calculated as a representative indicator of the magnitude of the error between the two values, without any reference to the direction of the error. In step 162 the absolute value of the error developed in step 160 is used as the independent variable in a look-up table which is stored in the Non-Volatile Memory 36 of the microcontroller 30. The independent value from the look-up table is then designated as variable D.

If the variable D is larger than the maximum value in the NVM table, this may indicate that additional fuel has been added to the fuel tank of the vehicle or for some other reason the displayed DTE value should be reset to the newly calculated value. This comparison of the independent variable D to the maximum value found in the look-up table is made at step 164 and if the resulting answer is yes then in step 166 the displayed value of DTE is reset to the newly calculated DTE. On the other hand, if this variable D, which represents the magnitude of the error between the two DTE values, is within the expected bounds of the look-up table. Then the program proceeds to step 168.

In step 168 the single bit representative of a type 1 or 2 system, as originally discussed in step 106, is again examined. In the case of a type 2 system the program will proceed to step 170. If D is less than or equal to 0.5 for the type 2 system, then the program proceeds to step 172 in which the presently displayed value of DTE is not changed. At step 170 if D is not less than or equal to 0.5, then the program proceeds to step 180, which is the same result as if the type bit examined in step 168 is a type 1 system.

Figure 3:
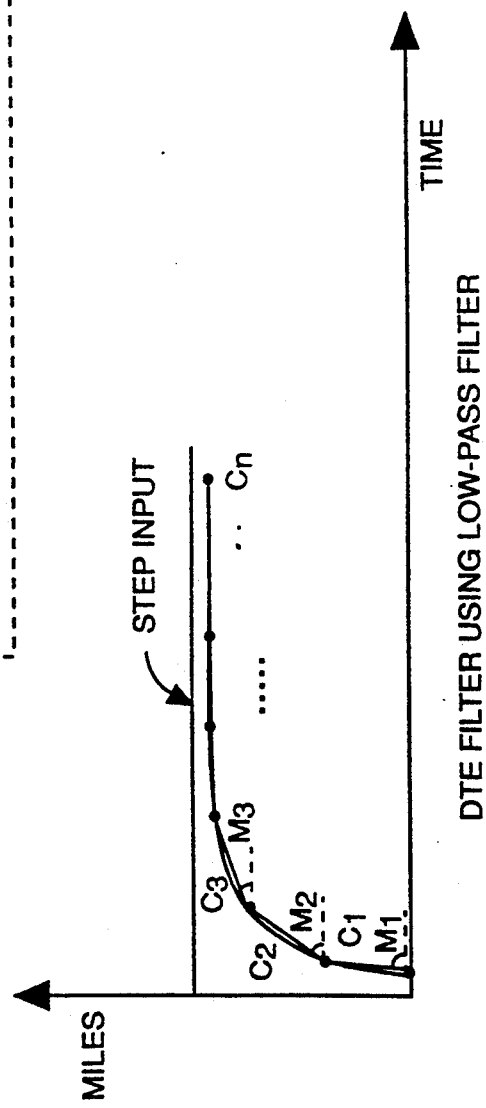
FIG. 3 illustrates the error corrective function of the look-up table used to incrementally adjust the displayed value of DTE in order to minimize step function changes.

Therefore, in step 162 if the magnitude of the error D is outside of the range of independent variables defined in NVM for the system, then at step 164 the display will be reset with the newly calculated value of DTE at step 166. This algorithm will result in a smoothing function versus time as illustrated generally in FIG. 3.

At step 180, each value of D in the look-up table will be paired with a dependent value that will correspond to the magnitude of the adjustment to be made in the displayed value, assuming that the displayed value will be changed. By using this look-up table and arranging the dependent values to be smaller than the related independent values, only a fraction of the error detected at step 160 will actually be corrected in the value of DTE displayed. As the program recycles through the new calculations every 131 milliseconds, the displayed value of DTE will asymptotically approach the new calculated value of DTE, thereby preventing a rapid change of the DTE value that could be disconcerting to the driver. Sample values of a representative look-up table are shown below:

| Magnitude of D ('D' = 'calculated - display DTE') | Delta values |
|---|---|
| SAMPLE VALUE TYPE I Look-up Table | |
| greater than 30 and less than or equal to 40 | 8 (decrement 8 miles/odo mile) |
| greater than 20 and less than or equal to 30 | 6 (decrement 6 miles/odo mile) |
| greater than 10 and less than or equal to 20 | 5 (decrement 5 miles/odo mile) |
| greater than 5 and less than or equal to 10 | 4 (decrement 4 miles/odo mile) |
| greater than .5 and less than or equal to 5 | 1 (decrement 1 mile/odo mile) |
| SAMPLE VALUE TYPE II Look-up Table | |
| greater than 30 and less than or equal to 40 | 5 (decrement or increment 5 miles/minute) |
| greater than 20 and less than or equal to 30 | 4 (decrement or increment 4 miles/minute) |
| greater than 10 and less than or equal to 20 | 3 (decrement or increment 3 miles/minute) |
| greater than 5 and less than or equal to 10 | 2 (decrement or increment 2 miles/minute) |
| greater than .5 and less than or equal to 5 | 1 (decrement or increment 1 mile/minute) |

In the case of a type 1 system, the dependent values from the look-up table correspond to the number of miles traveled per miles accumulated by the odometer (accumulated distance). However, for a type 2 system the dependent values from the look-up table will correspond to the rates of change in miles per minute by which the DTE display value is to be incremented or decremented. These look-up tables are programmed into the Non-Volatile Memory section of the memory 36 in the microcontroller 30, and therefore can be programmed for each type of vehicle and whether the system will be operated as a type 1 or a type 2 system.

Once the correction value Delta from the look-up table has been determined in step 180, the correction value can be processed differently for a type 1 and a type 2 system. This decision is made in step 182. If this system is a type 2, then at step 184 the previously discussed DTEADD flag is interrogated. If DTEADD is equal to 1 then in step 186 the Delta value obtained from the look-up table in step 180 is added to the presently displayed value, and at step 101 the display is updated. At step 184 if the DTEADD bit is not equal to 1, then the program proceeds to step 190 wherein the Delta value is subtracted from the present displayed value for DTE.

The program then proceeds to step 101 where the new value is then displayed. This same result would occur from step 182 for a type 1 display in which at step 192 the value of DTEADD is not equal to 1. Then, the program would proceed to step 190 where the Delta would be subtracted from the displayed value and the new value would be displayed as a result of step 101. In step 192 if the value of DTEADD is equal to 1, then the program will proceed to step 194, where a minimum decrement rate will be substituted for the Delta value. The minimum decrement rate or value will be stored in the Non-Volatile Memory 36, and can be updated or changed as required for type 1 systems only. Once this new value is substituted for Delta, the program proceeds back to step 190 where Delta is subtracted from the presently displayed value of DTE and then the new value is displayed as a result of step 101. In the preferred embodiment, the minimum decrement rate identified in step 194 for a type 1 system is typically a rate of ¼ of a mile of decrement for one mile traveled.

The subroutine including steps 182 through 194 will prevent the incremental addition of additional miles to the displayed value for a type 1 system, but will allow an incremental value to be added to a type 2 system in order to reflect that additional miles can be driven before fuel will be exhausted.

In the case of a type 1 system the displayed distance-to-empty value will be decremented very slowly, that is at a rate significantly less than the distance traveled. In this manner the display distance-to-empty will never increase, but will generally decrease at a slow rate until the newly calculated distance-to-empty value approaches the displayed value. After the calculated value equals the displayed value, the rate of decrement will accelerate for more normal operation. Stated another way, for a type 1 system the driver may travel two or three miles before the distance-to-empty displayed value is decremented by one mile under circumstances where the vehicle is experiencing a significant increase in the RAFE.

Therefore, by providing a single program that will allow the type 1 or type 2 system to be identified by a programmable bit, the DTE display can be either allowed to increase or decrease for a type 2 system or can be prohibited from displaying an increased DTE in a type 1 system. In this manner, the preference of different drivers can be accommodated using a single system design with only a change made to the NVM bit.

The scope of the protection provided by the following claims should not be limited by any descriptions provided herein but should be limited only according to the following claims.

We claim:

1. A method for calculating the distance to empty available from the remaining fuel in a motor driven vehicle, comprising the steps of:
   a. calculating a first value equal to an average of the distance traveled per unit of fuel consumed;
   b. calculating an intermediate distance to empty value by multiplying said first value by the quantity of field remaining;
   c. comparing said intermediate distance to empty value to a stored distance to empty value and developing an error signal therefrom;
   d. generating a first type signal indicative of the intended mode of operation and responsive thereto;
      correcting said intermediate distance to empty value with said error signal to allow only decrementing of the value if said first type signal is in a first state, and
      correcting said intermediate distance to empty value with said error signal to allow both incrementing and decrementing of the value if said first type signal is in a second state;
   wherein the corrected value of said distance to empty value is allowed only to decrement when said first type signal is in said first state and is allowed to both increment and decrement in said second state.

2. The method as described in claim 1 further including the step of visually displaying a distance to empty value representative of said corrected value of said intermediate distance to empty value.

3. The method as described in claim 2 further including the step of generating said stored distance to empty value representative of the previously displayed one of said distance to empty value.

4. The method as described in claim 3 further including the step of generating said first type signal responsive to at least one bit of data stored in a memory coupled to a microcontroller used for calculating.

5. The method as described in claim 3 further including the step of generating said first type signal responsive to the position of a switch for designating said first and second states.

6. The method as described in claim 2 wherein step a includes the step of sensing said first type signal and responsive thereto:
   updating the calculation of said first value as a function of either the distance traveled by the vehicle and of the fuel consumed if said first type signal is in said first state, and
   updating the calculation of said first value as a function of time if said first type signal is in a second state,
wherein said distance to empty value is updated responsive to distance traveled and fuel used in said first state and is updated responsive to time in said second state.

7. The method as described in claim 2 wherein step c also includes the substep of developing a correcting value by fetching a correction value from a look-up table having values therein corresponding to expected ones of said error signals, and then correcting said distance to empty value with said correcting value prior to the display thereof.

8. A method for calculating the distance to empty available from the remaining fuel in a motor driven vehicle, comprising the steps of:
   a. calculating a first value equal to the distance traveled per unit of fuel consumed by the motor vehicle;
   b. generating a first type signal indicative of the intended mode of operation and responsive thereto;
      updating the calculating of said first value as a function of the distance traveled by the vehicle and as a function of fuel consumed if said first type signal is in a first state, and
      updating the calculating of said first value as a function of time if said first type signal is in a second state,
   c. calculating an intermediate distance to empty value by multiplying said first value by the quantity of fuel remaining;
   d. displaying the distance to empty value representative of said intermediate distance to empty value;
   wherein the displayed distance to empty value is updated responsive to distance traveled and fuel used when said type signal is in said first state and is updated responsive to time when said type signal is in said second state.

9. The method as described in claim 8 wherein step c also includes the substeps of:
   c1. comparing said intermediate distance to empty value to a stored distance to empty value and developing an error signal therefrom;
   c2. sensing said first type signal and responsive thereto;
      updating said intermediate distance to empty value with said error signal to allow only decrementing of the value if said first type signal is in said first state, and
      updating said intermediate distance to empty value with said correcting signal to allow both incrementing and decrementing of the value if said first type signal is in said second state;

wherein the updated value of said distance to empty value is allowed only to decrement when said first type signal is in said first state and is allowed to both increment and decrement when said first type signal is in said second state.

10. The method as described in claim 9 further including the step of generating said stored distance to empty value representative of the previously displayed one of said distance to empty value.

11. The method as described in claim 10 further including the step of generating said first type signal responsive to at least one bit of data stored in a memory coupled to a microcontroller used for calculating.

12. The method as described in claim 10 further including the step of generating said first type signal responsive to the position of a switch for designating said first and second states.

13. The method as described in claim 10 wherein step c also includes the substep of developing a correcting value by fetching a correction value from a look-up table having values therein corresponding to expected ones of said error signals, and then correcting said distance to empty value with said correcting value prior to the display thereof.

14. A system for displaying the distance to empty available from the remaining fuel in a motor driven vehicle as a function of signals representing distance traveled, fuel consumed and fuel remaining, comprising in combination:

first means or calculating a first value equal to an average of the distance traveled per unit of fuel consumed;

second means for calculating an intermediate distance to empty value by multiplying said first value by the quantity of fuel remaining;

third means for comparing said intermediate distance to empty value to a stored distance to empty value and developing an error signal therefrom;

fourth means for generating a first type signal indicative of the intended mode of operation;

with said second means being operatively coupled to said first, third and fourth means, and further including, means for updating said intermediate distance to empty value with said error signal to allow only decrementing of the value if said first type signal is in a first state, and means for updating said intermediate distance to empty value with said error signal to allow both incrementing and decrementing of the value if said first type signal is in a second state; and fifth means, operatively coupled to said second means, for displaying a distance to empty value representative of the updated value of said intermediate distance to empty value;

wherein said updated value of said distance to empty value displayed is allowed only to decrement when said first type signal is in said first state and is allowed to both increment and decrement when said first type signal is in said second state.

15. The system as described in claim 14 wherein said third means or comparing further includes means for generating said stored distance to empty value from the previously displayed distance to empty value.

16. The system as described in claim 15 wherein said fourth means for generating further includes mean for generating said first type signal responsive to at least one bit of data stored in a memory operatively coupled to said fourth means.

17. The system as described in claim 15 wherein said fourth means or generating further includes means or generating said first type signal responsive to the position of a switch for designating said first and second states.

18. The system as described in claim 14 wherein said fifth means for displaying further includes means for sensing said first type signal and responsive thereto:

updating said first value as either a function of the distance traveled by the vehicle and of the fuel consumed if said first type signal is in said first state; and updating said first value as a function of time if said first type signal is in a second state;

wherein said distance to empty value is updated responsive either to distance traveled and fuel used in said first state and is updated responsive to time in said second state.

* * * * *